Jan. 16, 1951     C. E. HOWE, JR     2,538,456
PROTECTIVE GUARD ATTACHMENT FOR BAND SAWS
Filed June 7, 1949

Inventor
Charles E. Howe Jr.

By W. S. McDowell
Attorney

Patented Jan. 16, 1951

2,538,456

UNITED STATES PATENT OFFICE 2,538,456

PROTECTIVE GUARD ATTACHMENT FOR BAND SAWS

Charles E. Howe, Jr., Columbus, Ohio

Application June 7, 1949, Serial No. 97,624

4 Claims. (Cl. 143—159)

The present invention deals broadly with safety devices, and more specifically with protective guards of the type employed in connection with band saws to protect the fingers and hands of a person operating the saw from contact with the exposed blade portion of the saw during cutting operations.

In the past, bench-type band saws have been particularly troublesome from the standpoint of safety to the user. This stems from the fact that such band saws are normally provided with an endless flexible saw blade, a longitudinal segment of which is exposed and lies between a base table and the upper saw head whereby the material to be sawed or cut may be passed transversely of the saw blade between the table and the head of the saw frame to be cut by the continuous travel of the endless blade member. Also, it is usual in band saw construction to provide a longitudinally sliding supporting and guiding arm for the exposed segment of the blade which is adjustable longitudinally of the exposed segment so as to provide a support for the exposed segment of the blade during cutting operations. Due to the movable or adjustable nature of the supporting arm structure and the normal vertical disposition of the continuously moving saw blade, it has been extremely difficult to effectively shield the exposed blade segment in a manner which would insure against inadvertent contact between the blade and the hands of the person operating the saw without interfering with the overall operation of the saw.

It is, therefore, the primary object of the present invention to provide a protective guard device for band saws which insures against any accidental contact between the hands of a person operating the saw and the saw blade, and which at the same time permits the saw to operate at its normal efficiency without interference by the elements of the guard attachment.

It is another object of this invention to provide a protective guard attachment for band saws of the type having an endless blade member with an exposed cutting segment and a blade-supporting and guiding arm or frame which is adjustable longitudinally of the exposed cutting segment of the blade to afford support thereto during cutting operations, and wherein the protective guard device comprises a substantially U-shaped shield member for attachment to the adjustable arm in surrounding relation to that portion of the exposed segment of the blade which lies immediately adjacent to the guide arm, and which pivotally supports a pair of guard plates on either side which are arranged in depending relation to the U-shaped shield so as to normally surround that portion of the exposed blade segment which lies below the guide arm of the saw, provision being made for the movement of the guard plates during cutting operations from a depending normally protective position to a position parallel to the work passing through the saw blade, and thereafter to its depending position of protection.

For a further and more detailed understanding of the present invention and the various additional objects and advantages realized therefrom, reference is made to the following description and the accompanying drawing, wherein.

Figure 1:
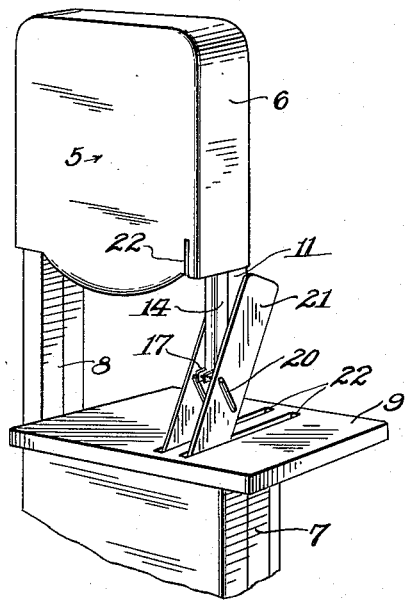
Fig. 1 is a perspective view of the upper portion of a band saw upon which is installed a protective guard device formed in accordance with the present invention.

Referring now to the drawing, the numeral 5 generally designates a band saw which, in the usual manner, is provided with an upper head portion 6, a base portion 7, an interconnecting tubular shaft 8, a work-supporting table 9, an endless flexible saw blade 10 which is trained about guide wheels or pulleys, not shown, which are respectively housed within the upper head portion 6 and lower base portion 7 of the saw, and which support and guide the saw blade 10 for continuous driven movement in the manner of a continuous belt. Additionally, the band saw 5 is provided with a vertically adjustable blade-supporting and guiding arm 11 which is suitably mounted within the head portion 6 for limited vertical sliding movement in a plane parallel to and adjacent the exposed longitudinal run of the blade 10. In the usual manner, the arm 11 is provided at its lower end with a blade-receiving trough member 12 which may advantageously be provided with suitable anti-friction bearing means, not shown, providing for the support of the rear edge portion of the cutting blade 10 during cutting operations. The arm 11 may be adjusted vertically between the head portion 6 and the table 9 in order that the exposed segment of the blade 10 may be supported immediately above the plane of a workpiece 13 being passed across the blade, it being understood that such vertical adjustment enables workpieces of various thicknesses and heights to be passed across the blade while at the same time maintaining a substantially rigid support for the blade to prevent transverse bending thereof during cutting operations and during the passage of a workpiece across the blade. It will further be understood that the elements of the band saw hereinbefore described are the usual elements which make up the present day band saw construction, and, as such, constitute no element or part of the present invention, the same being described for purposes of explanation only.

According to the present invention, an elongated, substantially U-shaped bracket or shield member 14, formed at either end with attachment extensions 15, is connected with the blade-supporting arm 11 of the saw, as by means of rivets 16, in a position to surround or enclose that portion of the saw blade 10 which lies immediately adjacent to the arm 11. The shield member 14 is preferably of a length corresponding to the length of the exposed cutting segment of the saw blade 10, and upon adjustment of the arm 11 downwardly into substantially abutting engagement with the table 9, the shield member 14 will substantially span the gap between the head 6 and the table 9. The shield member 14, at its upper end, extends within the normal saw and arm-receiving recess formed in the head 6, and is movable vertically therein in conjunction with the arm 11.

At its lower end, the shield member 14 is provided with a pair of struck-out transversely extending ears 17 between which is carried a pivot pin or bolt 18 disposed in a plane perpendicular to the plane of movement of the saw blade 10, and slightly in advance of the saw-toothed edge thereof. At either end, the pin 18 is provided with relatively reduced regions 19 which are slidably carried within a pair of diagonally disposed slots 20 formed in the central portion of a pair of independent rectangular guard plates 21. The guard plates 21 are arranged in spaced parallel relation on either side of the shield member 14, and due to the arrangement of the slots 20 and pivot pin 18, depend from the lower portion of the shield member 14 in slightly angularly inclined positions.

If desired the length of the guard plates 21 may be slightly greater than the distance between the head 6 and the table 9 in order that such guard plates may enclose the exposed segment of the blade 10 even when the arm 11 occupies its uppermost position of adjustment. In this event, the head portion 6 and table 9 are preferably slotted, as at 22, to accommodate the end portions of the guard plates and to permit the same to swing in a vertical plane about the pivot pin 18.

In operation, the arm 11 is initially adjusted in accordance with the height or thickness of the workpiece 13 in order to support the blade 10 immediately above the workpiece and thereby strengthen the blade transversely against bending or displacement during passage of the workpiece thereacross. In this position, as will be seen in Figs. 1 and 2, the shield member 14 encloses the upper exposed portion of the blade 10 above the workpiece, while the depending guard plates 21 serve to shield that portion of the exposed segment of the blade which is disposed below the lower end of the arm 11. The workpiece 13 may then be pushed across the leading edges of the guard plates 21 and into engagement with the saw-toothed edge of the blade 10. As the workpiece 13 is progressively pushed across the blade 10, the guard plates 21 rotate or swing about the pivot pin 18 until the same occupy substantially horizontal positions in spaced relation to the table 9.

This relative position will be assumed by the guard plates as the forward end of the workpiece 13 passes the plane of the blade 10, and the guard plates 21 will remain in their horizontal positions until the trailing end of the workpiece 13 approaches and substantially reaches the cutting edge of the saw blade, at which time, by nature of the diagonal slots 20, the ends of the guard plates 21 nearest the operator will drop down behind the workpiece as the cutting operation is finished. Thus, it will be seen that during the passage of a workpiece across the blade 10, the guard plates 21 rotate about the pivot pin 18 through approximately a 180° arc rather than first swinging backwardly to allow the workpiece to pass beneath the edges of the guard plates and then swinging forwardly again to their normally angularly inclined positions. Such action would obtain in the absence of the diagonal slots 20 and in the event that such plates were merely provided with an off-center pivotal connection.

Figure 2:
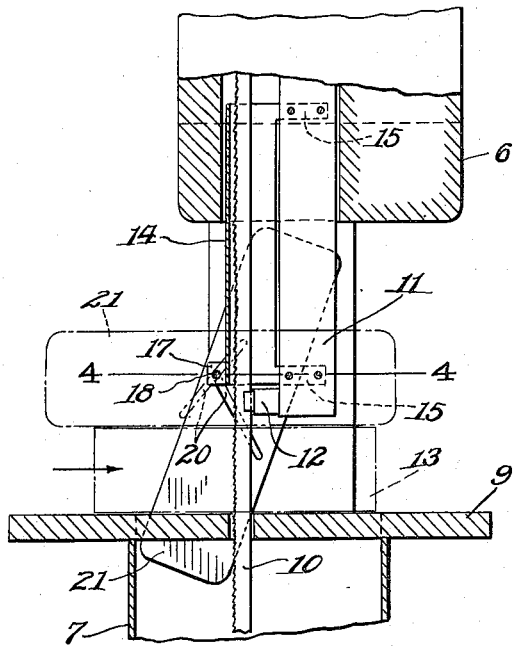
Fig. 2 is a longitudinal vertical sectional view taken through the band saw and protective guard device along the plane of the saw blade, and showing in broken lines the various positions assumed by the present guard device during a cutting operation.
Figure 3:
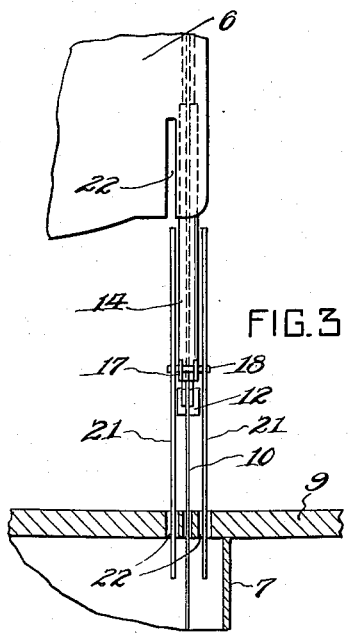
Fig. 3 is a side elevational view with the table portion of the band saw in vertical section looking toward the cutting edge of the saw blade.
Figure 4:
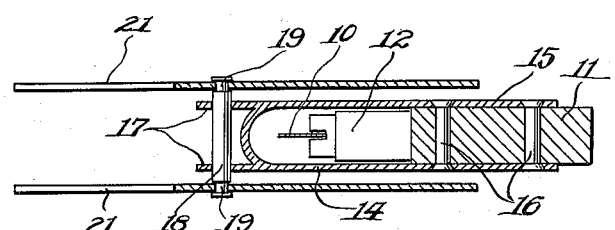
Fig. 4 is a detailed horizontal sectional view taken along the plane indicated by the line 4—4 of Fig. 2.

In Fig. 2 of the drawing, the rotational swinging movement of the guard plates 21 is illustrated by means of the broken line positions assumed by the guard plates during the passage of a workpiece across the cutting blade. With reference to Fig. 2, it will be seen that when the guard plates 21 occupy their horizontal positions, permitting the workpiece to pass across the lower edge thereof, the pivot pin 18 will occupy a position substantially in the center of the slots 20, and as the trailing edge of the workpiece passes the plane of the saw blade, the ends of the guard plates nearest the operator will swing behind the workpiece, thus permitting the pivot pin 18 to assume a position at the opposite end of the slots 20, and maintain the plates in their off-center angularly inclined disposition with respect to the shield member 14.

In view of the foregoing, it will be seen that the present invention provides a novel and mechanically efficient protective guard attachment for band saws of the type having a blade-supporting and guiding arm. Guard attachments formed in accordance with the present invention are characterized by their ability to completely surround and enclose the exposed segment of the band saw blade in a manner to preclude accidental contact between the fingers and hands of a person operating the saw and the saw blade except during actual passage of a workpiece through or across the blade. The arrangement of the various elements of the attachment also prevents the clothing of a person operating the saw from becoming engaged with the moving blade, the same at all times occupying a protective enclosing position with respect to the portion of the exposed segment of the blade not actually being used for cutting purposes.

The protective guard attachments are further characterized by their simplicity of construction, ease of operation and economy in manufacture and maintenance.

While a single preferred embodiment of the present invention has been described in detail, it will be manifest that various modifications with

I claim:

1. A protective guard attachment for band saws of the type having a continuous flexible saw blade with an exposed cutting segment and a blade-supporting and guiding member arranged adjacent and parallel to the exposed segment of said blade and movable longitudinally thereof, said attachment comprising an elongated generally U-shaped bracket for attachment to the blade-supporting and guiding member of a band saw in surrounding relation to the segment of the saw blade adjacent said guiding member, said bracket member being provided with a transverse projection having a pin-receiving opening therethrough; a headed pivot pin carried by said projection and extending outwardly on either side thereof; and a pair of spaced parallel guard plates formed with diagonally disposed slots receiving the ends of said pivot pin and carried by said pin for pivotal swinging and rotational movement in planes parallel to the exposed segment of said saw blade, the diagonal slots formed in said guard plates providing for a normally off-center support of said plates in depending relation to said bracket member whereby to normally cover any portion of the exposed segment of the saw blade not covered by said bracket member and providing for rotation of said guard plates about said pivot pin upon passage of work across the exposed segment of said saw blade.

2. A protective guard attachment for band saws of the type having an exposed blade segment and an arm disposed adjacent to and adjustable longitudinally of the exposed blade segment for supporting and guiding the blade during cutting operations, said attachment comprising an elongated U-shaped bracket member for attachment to the arm of said saw in surrounding relation to the segment of the saw blade disposed immediately adjacent to said arm, said bracket member when so attached serving to enclose only that portion of the saw blade which lies immediately adjacent to the arm of said saw in any position of adjustment of the latter; a pair of spaced parallel guard plates disposed on either side of said bracket member in depending relation thereto; and means pivotally connecting said guard plates with said bracket member and providing for 360° rotational movement of said plates in planes parallel to said bracket member and to the remaining exposed portion of the saw blade.

3. A protective guard for band saws of the type having an endless saw blade provided with a normally exposed cutting segment and a blade-supporting and guiding arm arranged adjacent to the exposed blade segment and adjustable longitudinally thereof, said guard comprising an elongated U-shaped shield member connected with said arm and extending laterally outwardly therefrom around the portion of the saw blade disposed adjacent to said arm, a pair of spaced parallel guard plates arranged on either side of said shield member in depending relation thereto; and means pivotally connecting said guard plates to said shield member for swinging movement on either side of the exposed cutting segment of said saw blade, said guard plates being arranged to normally hang from said shield member in enclosing relation to the exposed segment of said saw blade and to rotate relative to said shield member and saw blade during the passage of a workpiece across said blade.

4. A protective guard for band saws of the type having an endless saw blade provided with a normally exposed cutting segment and a blade-supporting and guiding arm arranged adjacent to the exposed blade segment and adjustable longitudinally thereof, said guard comprising an elongated U-shaped shield member connected with said arm and extending in laterally offset relation thereto and surrounding the portion of the saw blade disposed adjacent to said arm, a pair of spaced parallel guard plates disposed in depending relation to one end of said shield member and extending downwardly on either side thereof, and means connecting said guard plates to said shield member and providing for rotational movement of said guard plates with respect to said shield member and the exposed cutting segment of said saw blade, said last named means serving to normally maintain said guard plates in spaced parallel relation on either side of the exposed cutting segment of said saw blade and to permit said guard plates to swing to perpendicular positions with respect to said saw blade during passage of a workpiece across said blade.

CHARLES E. HOWE, Jr.

REFERENCES CITED

The following references are of record in the file of this patent:

UNITED STATES PATENTS

| Number | Name | Date |
| --- | --- | --- |
| 1,369,824 | McDonnell | Mar. 1, 1921 |
| 1,511,797 | Berghold | Oct. 14, 1924 |
| 1,811,906 | Andre | June 30, 1931 |

FOREIGN PATENTS

| Number | Country | Date |
| --- | --- | --- |
| 301,679 | Great Britain | Dec. 6, 1928 |